W. O. HUTCHINS.
WIRE STRETCHER.
APPLICATION FILED AUG. 25, 1910.

1,034,458.

Patented Aug. 6, 1912.

Witnesses

William O. Hutchins
Inventor
by C. A. Snow & Co.
Attorneys

UNITED STATES PATENT OFFICE.

WILLIAM O. HUTCHINS, OF VERMILION GROVE, ILLINOIS.

WIRE-STRETCHER.

1,034,458.  Specification of Letters Patent.  Patented Aug. 6, 1912.

Application filed August 25, 1910. Serial No. 578,923.

*To all whom it may concern:*

Be it known that I, WILLIAM O. HUTCHINS, a citizen of the United States, residing at Vermilion Grove, in the county of Vermilion and State of Illinois, have invented a new and useful Wire-Stretcher, of which the following is a specification.

It is the object of this invention to provide, in a simple, merchantable and inexpensive form, a wire stretcher which may readily be disposed in abutment with one of the posts of a fence, and there retained, in a novel and improved manner, during the stretching operation.

Another object of the invention is to provide novel means for mounting the tractile member of the stretcher, so that the same may have a swiveled movement.

Another object of the invention is to provide novel means for assembling the component parts of the wire stretcher, and to provide novel means for actuating the tractile element of the wire stretcher.

The drawings show typical embodiments merely, and it is to be understood that changes, properly falling within the scope of what is claimed, may be made without departing from the spirit of the invention or sacrificing any of the advantages thereof.

In the accompanying drawings,—Figure 1 is a side elevation; Fig. 2 is a top plan; and Fig. 3 is a longitudinal section of a portion of the device, parts being shown in elevation.

The invention includes, as a primary and fundamental element, a carrying member, comprising a head 1, and diverging stakes 2. A screw 3 is swiveled in the head 1, and a nut 4 is rotatably mounted upon the screw, so that the screw may be advanced longitudinally in the head 1. The ends of the stakes 2 are adapted to be placed against a fixed abutment, such, for instance, as a fence post 5. The wires 6 of the fence are connected with the screw 3, and by rotating the nut 4, the wires 6 will be drawn taut, whereupon they may be stapled, or otherwise secured to the post 5.

In a more detailed description, and referring particularly to Fig. 3, it will be seen that the head 1 includes a hollow, conical body portion 7. Formed integrally with the conical portion 7, is a plate 8 to which the stakes 2 may be secured by bolts 10 or the like. In this plate 8 there are openings 9, adapted to receive the bolts 10, whereby the stakes 2 may be held in place upon the plate 8. The head 1 likewise includes a transverse butt block 11, it being understood that the butt block 11, the plate 8 and the conical portion 7 are preferably cast in one piece. The conical bore of the head is extended through the butt block 11, as shown at 12. The end face of the butt block 11 is rounded outwardly as shown at 14.

A plano-concave bearing member 15 is provided, one end face of which is rounded as shown at 16, to correspond with the rounded face 14 of the butt block 11. Thus it will be seen that the bearing member 15 may move smoothly over the rounded face 14 of the butt block 11. The rear face of the bearing member 15 is flat, as shown at 17. There is an opening 18 in the center of the bearing member 15, and, as seen in Fig. 3, the screw 3 may be inserted axially through the hollow conical portion 7 of the head, and through the opening 18 in the bearing member 15. This opening 18 in the bearing member is of somewhat larger diameter than the screw 3, so that the screw 3 will fit loosely in the opening 18.

The nut 4 is threaded upon the screw 3 and bears fairly against the flat rear face 17 of the bearing member 15. This nut 4 has diametrically projecting arms 19, provided with rectangularly disposed extensions 20, whereby the nut may be rotated.

In the forward end of the screw 3 there is an eye 21, adapted to receive a chain 22. The free end of this chain 22 is wound about, or secured in any other desired manner to the wire-holding means 26.

A retractile spring 29 is secured at one end, as denoted by the numeral 30, to the carrying member, preferably, as shown, to the uppermost of the stakes 2. This spring 29 is extended to one side of the carrying member. The free end of this retractile spring 29 may be provided with any suitable means whereby the said spring may be connected with the post 5. If desired, the free end of the spring 29 may carry a hook 31, provided with spaced prongs 32, which are curved, as seen to best advantage in Fig. 2, so as to extend partway around the post 5 and engage the same. When a hook of this form is used, the wire stretcher may readily be connected with a circular post, or with a square one.

A chain 33 or the like, is secured at one end to the carrying member and is extended therefrom in an opposite direction to the spring 29. The free end of the chain 33 is secured to an earth-engaging pin 34.

The practical operation of the device is as follows. The prongs 32 of the hook 31 are engaged in the post 5, the ends of the stakes 2 being brought into bearing upon the post 5. The chain 33 is then extended laterally from the carrying member, and drawn upon until the carrying member is properly positioned with respect to the post 5, whereupon the pin 34 will be driven into the ground. Owing to the fact that the retractile spring 29 is provided, the carrying member will be held in place upon the post 5. Moreover, this retractile member will permit the carrying element of the structure, comprising as hereinbefore pointed out, the head 1 and the stakes 2, to be swung in a horizontal plane, to secure the desired angle between the carrying member and the wires 6. When the carrying member has been placed in abutment with the post 5, the wire holding means 26 is secured to the wires 6, whereupon the handles 20 may be seized, rotating the nut 4. This rotation of the nut 4 will retract the screw 3, tightening the wires 6.

By reason of the fact that the screw 3 is loosely mounted in the head, the screw and the chain 22 will be in alinement during the operation of the device, so that the screw 3 will be subjected to tensile strain only, the possibility of bending the screw being avoided. The bearing member 15 will slide readily over the face 14 of the head, the flat rear face 17 of the head giving a proper bearing for the nut 4, even though the screw 3 be tilted laterally, or tilted vertically out of the horizontal.

Having thus described the invention, what is claimed is:—

A device of the class described comprising a conical body provided at its smaller end with a transverse butt block, the outer face of which is convexed; a bearing having a concaved face to fit the convexed face of the butt block, and an oppositely disposed flat face; a nut to engage the flat face of the bearing; and a screw provided at one end with wire-engaging means, the other end of the screw being extended through the body, through the butt block and through the bearing, into threaded engagement with the nut; the nut being spaced from the butt block, whereby the bearing may move transversely upon the butt block, without bringing the nut and the butt block into engagement.

In testimony that I claim the foregoing as my own, I have hereto affixed my signature in the presence of two witnesses.

WILLIAM O. HUTCHINS.

Witnesses:
BERTRAM REES,
J. S. MORRISON.

---

Copies of this patent may be obtained for five cents each, by addressing the "Commissioner of Patents, Washington, D. C."